H. A. BOWDISH.
SPEED RECORDER.
APPLICATION FILED JAN. 4, 1918.

1,347,676.

Patented July 27, 1920.
2 SHEETS—SHEET 1.

WITNESSES
James F. Crown
Wm Seaman

INVENTOR
Harry A. Bowdish,
By Richard B. Owen,
ATTORNEY

H. A. BOWDISH.
SPEED RECORDER.
APPLICATION FILED JAN. 4, 1918.
1,347,676.
Patented July 27, 1920.
2 SHEETS—SHEET 2.
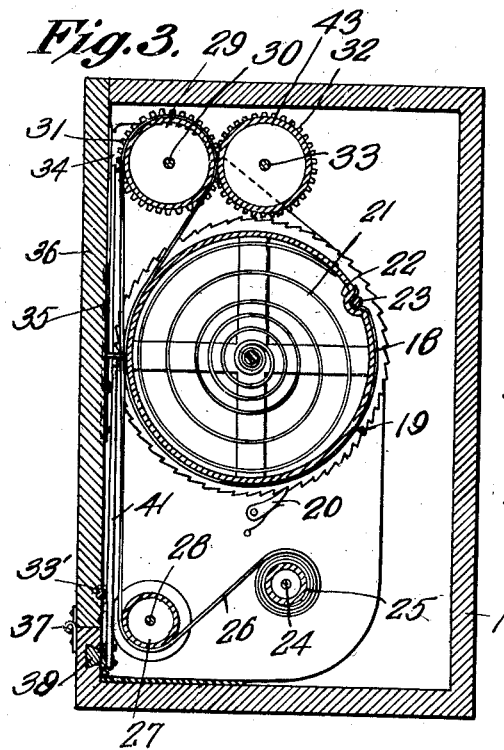
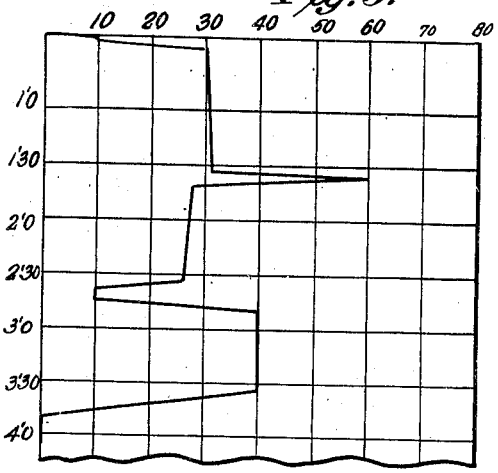
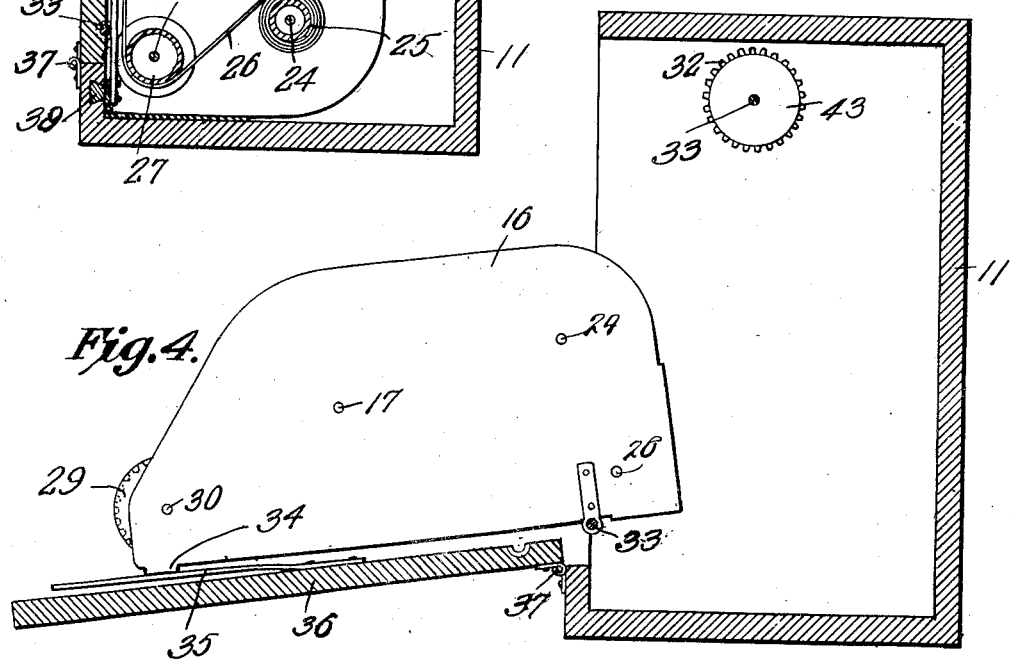
WITNESSES
James F. Crown,
Wm Zeaman
INVENTOR
Harry A. Bowdish,
By Richard B. Owen,
ATTORNEY

UNITED STATES PATENT OFFICE.

HARRY A. BOWDISH, OF EAGLE PASS, TEXAS.

SPEED-RECORDER.

1,347,676.　　　　Specification of Letters Patent.　　Patented July 27, 1920.

Application filed January 4, 1918. Serial No. 210,324.

*To all whom it may concern:*

Be it known that I, HARRY A. BOWDISH, a citizen of the United States, residing at Eagle Pass, in the county of Maverick and State of Texas, have invented certain new and useful Improvements in Speed-Recorders, of which the following is a specification.

This invention has relation to recording instruments, and has for an object to provide an instrument for use in connection with motor vehicles, or other self-propelled conveyances whereby to permanently record upon a strip of moving paper the speed of the conveyance at any instant during the period of travel thereof.

Another object of the invention is to provide a recording instrument for the purpose above described adapted for association with a standard time piece, and a speed registering instrument and embodying means operable by these two devices for permanently recording the speed of the conveyance at any instant during travel thereof in the manner above set forth.

Another object of the invention is to provide a recording instrument having the above named characteristics embodying a casing, and a frame movably mounted therein for positioning from a position within the casing to a position without, said frame supporting the rolls of papers and actuating mechanism therefor, with means operable by the time piece and speed registering mechanism for operating the paper winding mechanism and a recording stylus mounted for movement across the surface of the paper.

In addition to the foregoing my invention comprehends improvements in the details of construction and arrangement of the correlative parts, to be hereinafter more fully described and particularly set forth in the appended claims.

In the accompanying drawings in which similar and corresponding parts are designated by the same characters of reference throughout the several views in which they appear;

Fig. 3, is a vertical section taken on the line 3—3 of Fig. 1.

Fig. 4, is a view similar to the immediate preceding figure illustrating the frame in an outward position, and Fig. 5, is a detail view of a portion of a strip of paper upon which the recordation is made.

Figure 1:
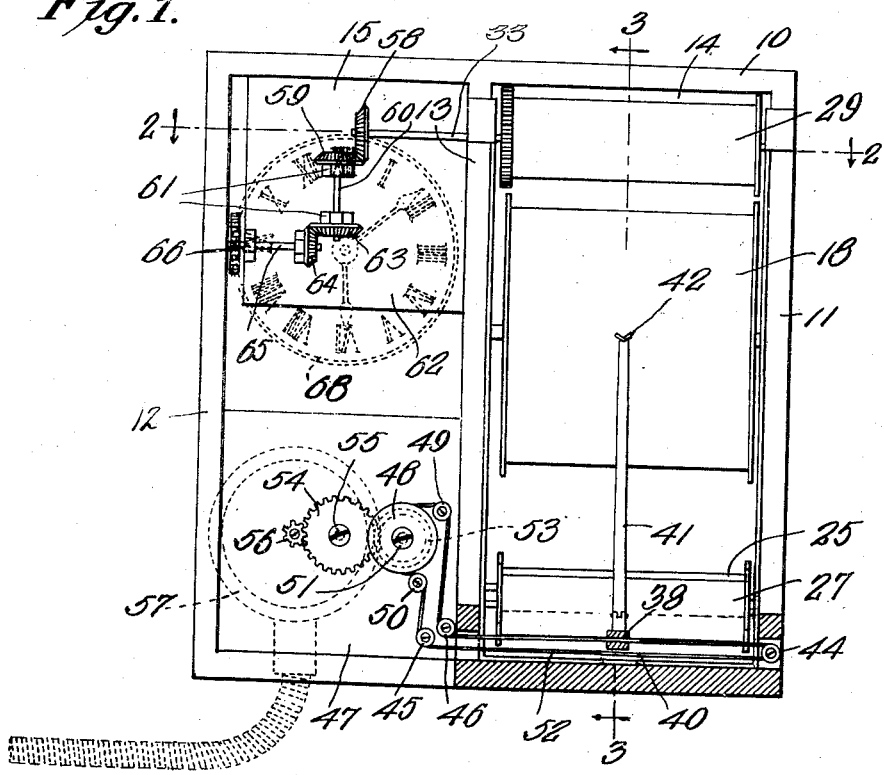
Figure 1, is a view in front elevation of a recording instrument constructed in accordance with my invention illustrating the cover removed.
Figure 2:
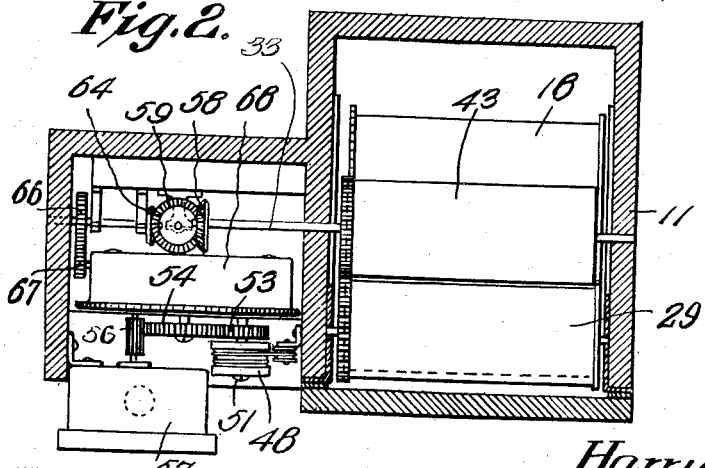
Fig. 2, is a horizontal section taken on the line 2—2 of the preceding figure.

With reference to the drawings, 10 indicates a casing having right and left hand side walls 11 and 12 respectively, the casing being divided by a vertical partition 13 defining a paper winding mechanism containing compartment 14, and an instrument compartment 15.

Mounted within the paper winding mechanism compartment 14 is a frame comprising side plates 16 which support therebetween at a point intermediate the ends of the plates a shaft 17 which is fixedly held in the plates and which support loosely a drum 18 having a flange 19 at one end formed with a serrated periphery for engagement by means of a pawl 20 pivotally mounted upon the inner face of one of the side plates. A coil spring 21 is inclosed within the drum with the inner end of the spring connected to the shaft 17 and the outer end connected to the interior surface of the drum as clearly shown in Fig. 3. The surface of the drum is grooved longitudinally as at 22 to receive a wire 23 whereby one end of a strip of paper may be clamped beneath the wire.

The plates 16 also suppport a roller 24 designed to support a roll of paper 25, one end of which paper, indicated at 26, may be passed around a roller 27 positioned between the lower ends of the plates and loosely mounted upon a shaft 28, the paper being then extended upwardly and partly around a roller 29 fixedly mounted upon a shaft 30 journaled in the side plate. Said shaft 30 carries upon its end projecting beyond the outer face of one plate 16 a gear wheel 31 which is designed for meshing engagement with a gear wheel 32 mounted upon a shaft 33 which is journaled in the partition 13 mentioned above. The side plates 16 forming the frame are mounted upon a rod 33' extended across the front of the casing whereby the frame may be pivotally mounted on said rod for movement from a position within the casing as indicated in Fig. 3, to a position without the casing as indicated in Fig. 4. The upper end of each plate is formed with outwardly extending lugs 34 which are engageable by springs 35 secured to the inner face of a cover plate 36 hingedly connected as at 37 to the lower edge of the compartment 14. The springs, when the cover plate is in a closed position, by pressing against the lugs 34 retain the frame within the casing and also act to retain the gear wheels 31 and 32 in engagement.

A groove is formed in the inside surface of the front wall of the casing below the door 36, and a block 38 having a dovetailed portion is seated in the groove. The lower end of a vertical stylus arm 41 is connected to the block and a stylus or pen 42 is provided at the upper end of the arm for engaging the stretch of paper between the rollers 27 and 29. It will be noted that the paper after passing around the roller 29 is engaged by a roller 43 mounted upon the shaft 33, the pressure of the spring 35 of the cover acting to retain said rollers in engagement with the paper, the end of the paper being then trained around the drum 18 and engaged beneath the wire 23 in the manner described above.

A roller 44 is mounted on the front edge of the wall 11, a pair of rollers 45 and 46 being mounted at a point opposite the roller 44 and upon a wall 47 provided within the instrument containing compartment 15. A grooved drum 48 is also mounted on said wall 47 and a pair of rollers 49 and 50 are mounted above and below said drum, the drum being loosely mounted upon a shaft 51 secured to said wall 47. An endless element, such as a wire or the like indicated at 52 is provided, being passed once around the drum 48, and one stretch passed around the roller 49, thence around the roller 46 to the roller 44, around the same returning along its other stretch around the rollers 45 and 50 and back to the drum 48. A pinion 53 is mounted for rotation with the drum 48 and for meshing engagement with a pinion 54 loosely mounted upon a stud 55 projecting from the wall 47, said pinion 54 being in meshing engagement with a pinion 56 which is movable coincidently with the movement of the pointer of a conventional automobile speed indicating instrument or speedometer shown at 57.

The shaft 33 mentioned above which is journaled in the partition 13 extends into the compartment 15 and is provided with a bevel gear 58 in meshing engagement with a bevel gear 59 mounted upon a vertical shaft 60 which is journaled in bearings 61 mounted upon a wall 62, the lower end of said shaft 60 carrying a bevel gear 63 which meshes with a similar gear 64 mounted upon a short horizontal shaft 65 also journaled in bearings 66ª which are mounted upon the wall 62. A pinion 67 is mounted on said shaft 65 for engagement with a pinion 66 which is operable by the mechanism of a time piece indicated at 68.

In operation, the speedometer 57 is connected as usual to the front wheels of a vehicle in which the speed recording mechanism is meant to be embodied, and as the speed of the vehicle varies the motion of the pinions 56 is transmitted through the pinions 54 and 53 to the drum 48, the rotation thereof acting through the flexible element 52 oscillates the pointer arm 41 and a line is inscribed upon the strip of moving paper 26. The motion of the time piece actuating mechanism is uniform and continuous, motion of the pinion 67 being transmitted to the pinion 66, and thence through the pinions 64, 63, 59 and 58 to the roller 43. The paper, being held between said roller 43 and the roller 29 is uniformly withdrawn from the roller 25, and the slack in the paper after passing between said rollers 43 and 29 is taken up by the drum 18 owing to the provision of the spring 21 therein. The paper is thus moved continuously and uniformly, and during travel of the machine the speed thereof at any instant is permanently recorded.

While I have illustrated and described my invention with some degree of particularity, I realize that in practice various alterations thereof may be made, and I therefore desire to reserve the right and privilege of changing the form of the details of construction, or otherwise altering the arrangement of the correlative parts without departing from the spirit of the invention or the scope of the appended claims.

Having thus described my invention what I claim as new and desire to secure by Letters Patent is:—

1. A recording instrument comprising a casing divided into two compartments, a hinged door for closing one of the compartments, a spring secured to the inner face of the door, a frame pivotally mounted within the compartment having the door and adapted to be engaged by the spring on the door, means mounted in said frame for actuating a strip of paper and including a roller, a pressure roller mounted in said casing, and with which said frame carried roller contacts, being held engaged by said spring, a pointer mounted in said frame for movement across the paper, said pointer actuated by a standard speedometer, gearing in the other compartment actuated by a standard time piece, and means associated with said gearing for operating the paper actuating mechanism.

2. An instrument of the class described comprising a casing divided into compartments, one of which is equipped with an outwardly opening door, a frame pivoted in said door-equipped compartment to swing outwardly on the opening of the door, a spring controlled drum mounted in said frame, a pair of contacting rollers positioned above said drum, one being carried by the frame and the other by the casing, a paper carrying roll mounted below said drum in said frame, a paper guide mounted in said frame, the paper fed from said roller being secured to said drum and passed around said guide and between the first-mentioned rollers, and means carried by said door for holding said frame in operative position, and the first-mentioned rollers contacting.

In testimony whereof I affix my signature in presence of two witnesses.

HARRY A. BOWDISH.

Witnesses:
   P. E. REHSE,
   D. McDONNELL.